Feb. 24, 1942.    N. H. HILLER, JR    2,274,292
REFRIGERATING SYSTEM
Original Filed Aug. 26, 1937
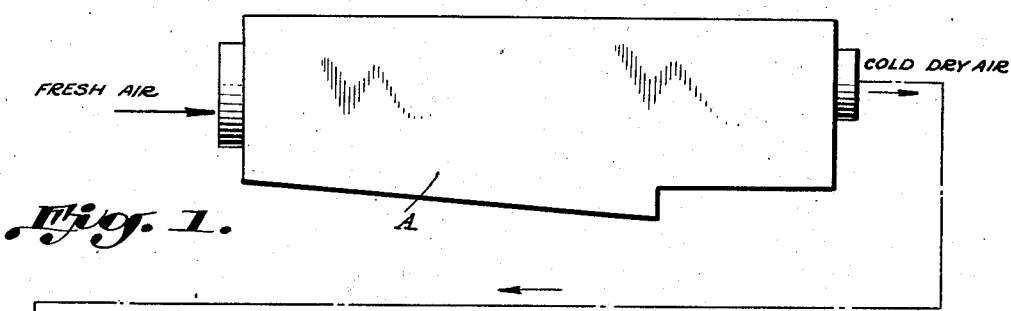
Fig. 1.
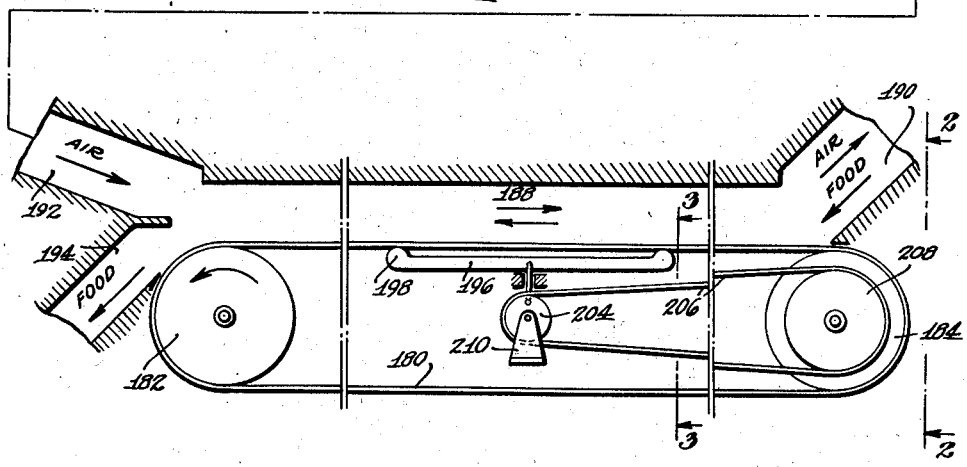
Fig. 2.              Fig. 3.
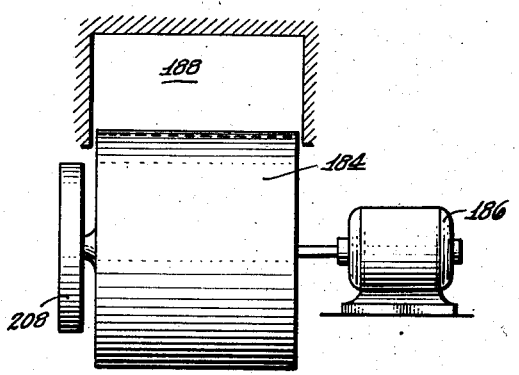 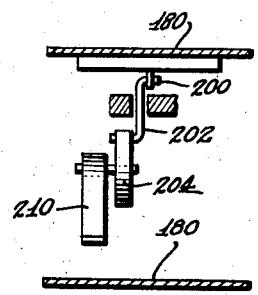
Inventor:
NICOLAI H. HILLER, JR.
By R. J. Dearborn
Daniel Stryker
Attorneys Patented Feb. 24, 1942

2,274,292

UNITED STATES PATENT OFFICE 2,274,292

REFRIGERATING SYSTEM

Nicolai H. Hiller, Jr., Bronxville, N. Y., assignor, by mesne assignments, to The Texas Company, New York, N. Y., a corporation of Delaware Original application August 26, 1937, Serial No. 160,942. Divided and this application March 1, 1938, Serial No. 193,227

4 Claims. (Cl. 62—104)

This invention relates to food preservation and more particularly to a method and an apparatus for the quick freezing of food particles by subjecting them to direct contact with a cold, dehumidified gas.

This is a division of a copending application Serial No. 160,942 filed August 26, 1937.

In the application, Serial No. 160,942, and also in the copending application, Serial No. 302,660, filed November 3, 1939, a continuation-in-part of application Serial No. 160,942, a method and an apparatus are described for continuously supplying a cold, neutral gas such as air, which is clean and which has a minimum moisture content.

It is the purpose of the present invention to provide an efficient method and a comparatively simple apparatus for utilizing cold, dry gas or air such as may be produced in accordance with the disclosures in the aforementioned pending patent applications for the quick freezing of foods. The food particles are passed through a chamber in direct contact with and in countercurrent relation to a stream of the cold, dry gas, the food particles being agitated during the passage so as to secure uniform freezing thereof.

For a better understanding of the invention reference may be had to the accompanying drawing in which Figure 1 is an elevation of an apparatus embodying the invention;

Figure 2 is an end view of the apparatus of Figure 1, and

Figure 3 is a sectional view taken on line 3—3 of Figure 1.

In Figures 1, 2 and 3 a diagrammatic showing is given of an arrangement for the quick freezing of foods. An air cooling and conditioning unit is illustrated at "A", this unit being preferably of the type disclosed in the aforementioned applications, Serial Numbers 160,942 and 302,660 and capable of supplying a cold, dry, neutral gas, such as air, at temperatures of approximately 30 to 35 degrees below zero Fahrenheit. A continuous belt 180 driven from pulleys 182 and 184 by means of a suitable motor 186 is disposed so that food products may be carried by the upper portion of the belt in direct countercurrent contact with the air which has been cooled and dehumidified. A chamber 188 formed by suitably heat-insulated top and side walls is disposed above the belt 180 and at one end contains a hopper 190 through which food may be placed upon the belt 180. The cold dehumidified air or gas enters the chamber 188 through an opening 192 at the end opposite the hopper 190 and passes through the chamber in contact with the foods on the belt 180 and then outwardly either through the hopper 190 or some other suitable outlet. The foods having been frozen on the belt leave the apparatus through a chute 194 and may then be packed and shipped as desired. It has been found that foods such as fresh green peas and berries may be frozen in a few seconds when contacted by cold dry air of a temperature of from 30° to 35° below zero Fahrenheit and the speed of the motor 186 may be regulated to allow the foods to remain in contact with the cold air for any desired period.

Although air has been mentioned in this connection, other gases or mixtures of gases such as carbon dioxide or ethylene and air in various suitable proportions may be used, and in many instances such a gas may be used to bring out the full bloom of certain foods such as fruits, vegetables, etc. while they are being frozen in passage through the chamber 188.

It may be desired to provide some form of agitating means for shaking the belt so that all sides of the foods will be reached by the cold air or gas, and a simple arrangement for this purpose has been illustrated. A bar 196 which may contain two or more projections or fingers 198 is disposed directly below the upper portion of the belt 180 and this bar may be reciprocated vertically by means of a rod 200 supported in suitable bearings and the lower end of which is attached to a crank 202 driven from a small pulley 204 which in turn may be driven by means of a belt 206 attached to a pulley 208 on the pulley 184. The pulley 204 will, of course, be mounted in a suitable bearing 210. Thus rotation of the pulley 208 will cause rotation of the small pulley 204 with consequent vertical reciprocating movement of the bar 196 and projections 198 against the belt 180 so as to jar or agitate the food being carried on the belt.

Obviously many modifications and variations of the invention may be made without departing from the spirit and scope thereof, and therefore only such limitations should be imposed as are indicated by the appended claims.

I claim:

1. In an apparatus for freezing food products, an endless belt conveyor, means for actuating said conveyor, an elongated chamber associated with said conveyor, means for placing food products on said conveyor at one end of said chamber, means for passing a cold gas through said chamber in countercurrent relation to the movement of the products on said conveyor, and means for shaking a portion of said conveyor to agitate the food products, the arrangement being such that said food products will be frozen by contact with said gas.

2. In an apparatus for freezing food products, a horizontally disposed, endless belt conveyor, means for actuating said conveyor, means for placing food products on said belt at one end of the upper portion thereof, means for conveying said products from the other end of the upper portion of said belt, means for passing a cold, dry, neutral gas in contact with and in countercurrent relation to the food products on said belt so as to freeze said food products as they are moved along by said conveyor and means for vibrating a portion of the belt to agitate the food products so as to cause uniform freezing of said food products.

3. In an apparatus for freezing food products, an endless belt conveyor, means for actuating said conveyor, an elongated chamber associated with said conveyor, means for placing food products on said conveyor at one end of said chamber and means for passing a cold gas through said chamber in countercurrent relation to the movement of the products on said conveyor, the arrangement being such that said food products will be frozen by contact with said gas, and means associated with the portion of said belt carrying said food products for intermittently moving said belt portion in a vertical direction so as to agitate said food products in their passage through said chamber to produce uniform freezing of said products.

4. A method of freezing foods which comprises placing said foods loosely on a substantially flat support, moving said support through an elongated chamber in intimate, direct contact with and in countercurrent relation to a stream of cold, neutral gas, and simultaneously therewith shaking said support in a vertical direction to agitate said foods and provide uniform freezing thereof.

NICOLAI H. HILLER, Jr